(12) United States Patent
Nakaminami et al.

(10) Patent No.: US 6,370,994 B1
(45) Date of Patent: Apr. 16, 2002

(54) CLAMPING DEVICE FOR MACHINE TOOLS

(75) Inventors: Masamitsu Nakaminami; Yoshinori Sakashita, both of Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 09/940,488

(22) Filed: Aug. 29, 2001

Related U.S. Application Data (62) Division of application No. 09/516,889, filed on Mar. 2, 2000.

(30) Foreign Application Priority Data

Mar. 12, 1999 (JP) ............................................ 11-065947

(51) Int. Cl.$^7$ .............................. B23B 17/00; B23B 3/36
(52) U.S. Cl. .............................. 82/149; 82/153; 82/154
(58) Field of Search ...................... 82/132, 133, 149, 82/153, 154, 152, 137, 171, 173, 1.11, 11.4, 11.5

(56) References Cited

U.S. PATENT DOCUMENTS

| | | | | |
|---|---|---|---|---|
| 3,600,987 A | * | 8/1971 | Kvasnicka | 82/11.3 |
| 4,412,465 A | * | 11/1983 | Wright | 82/1.2 |
| 4,831,782 A | * | 5/1989 | Clough et al. | 51/48 R |

* cited by examiner

Primary Examiner—Henry Tsai
(74) Attorney, Agent, or Firm—Smith Patent Office

(57) ABSTRACT

The invention provides a clamping device for machine tools capable of preventing the occurrence of impressions. In a clamping device for machine tools, a tailstock (movable carriage) is provided on a top face of a fixed bed and the tailstock is positioned and fixed with respect to the fixed bed. The tailstock is supported by linear-motion bearings (guides) which are disposed between the tailstock and the fixed bed. Blocks are slidably engaged with rails extending in the travel direction with rollers interposed between them. Further, a recess portion extending in the travel direction is formed in the top surface of the fixed bed. A cylinder mechanism is arranged so that left and right inner walls in the recess portion are pressed by a pair of pistons provided on the undersurface of a headstock.

2 Claims, 8 Drawing Sheets

CLAMPING DEVICE FOR MACHINE TOOLS

This application is a divisional application of U.S. application number 09/516,889 filed on Mar. 2, 2000, currently pending.

BACKGROUND OF THE INVENTION

1. Field of the Invention

The present invention relates to a clamping device for machine tools in which a movable carriage, provided linearly movable on a fixed bed, is positioned and fixed.

2. Discussion of the Related Art

In a lathe, for example, that has a headstock secured onto a fixed bed and a movable tailstock, a workpiece is held by a spindle of the tailstock and a chuck of the headstock. Thus, the machining process is carried out by rotating the workpiece. In this case, to prevent undesirable movement of the workpiece, the tailstock must be securely positioned and fixed to the fixed bed with a clamping device.

Figure 1:
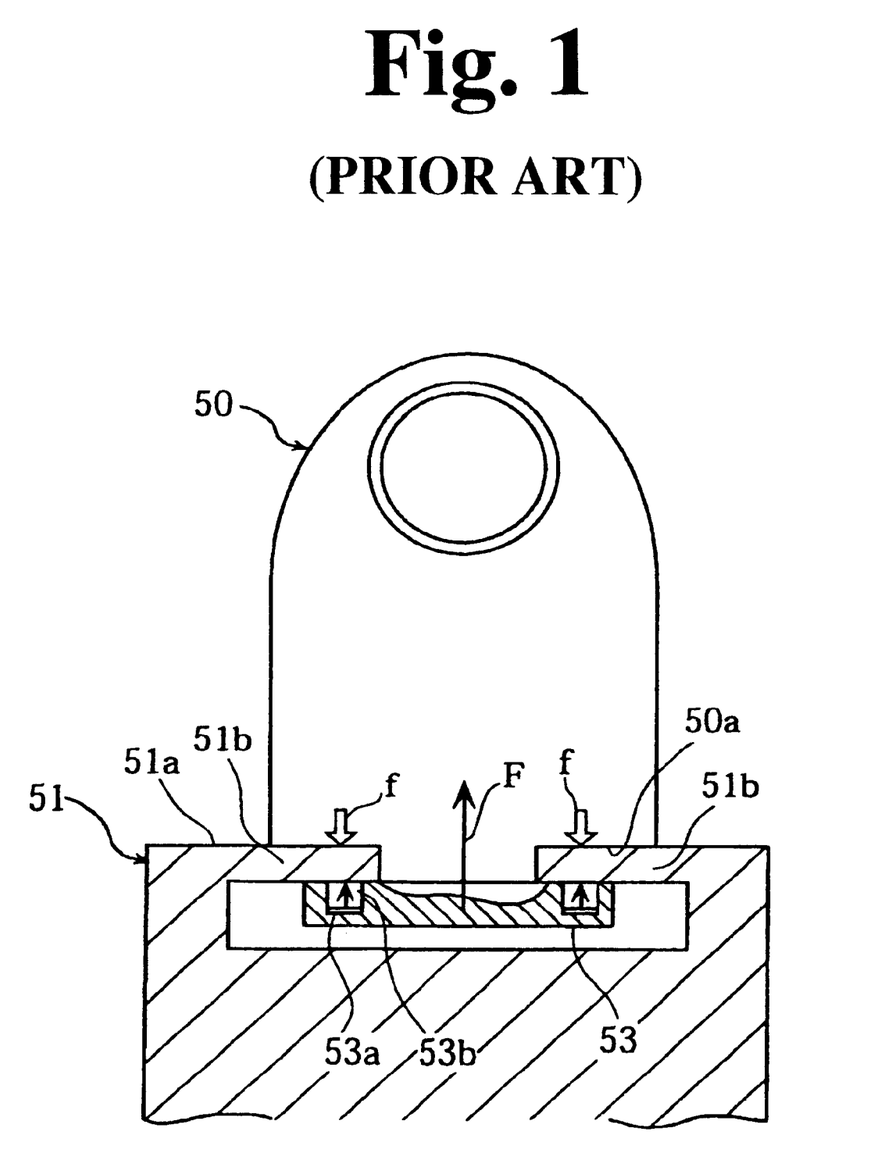
FIG. 1 is a partial cross sectional view showing a problem that is overcome by t he present invention.

A conventional clamping device is shown in FIG. 1. In this clamping device, a tailstock 50 is set on a fixed bed 51 with their sliding surfaces 51a, 50a in sliding contact with each other. A piston member 53b is disposed in a hydraulic chamber 53a formed in a pinching plate 53 of the tailstock 50. The piston member 53b is elevated with oil pressure. A clamping force F is supplied to the hydraulic chamber 53a so that a ceiling portion 51b of the fixed bed 51 is pinched between the piston member 53b and the tailstock 50.

Japanese Utility Model Laid-Open Publication No. 2570872 discloses a clamping device in which a protrusion formed at the undersurface of a movable table is pinched by a pair of piezoelectric elements provided on a fixed base.

Figure 2:
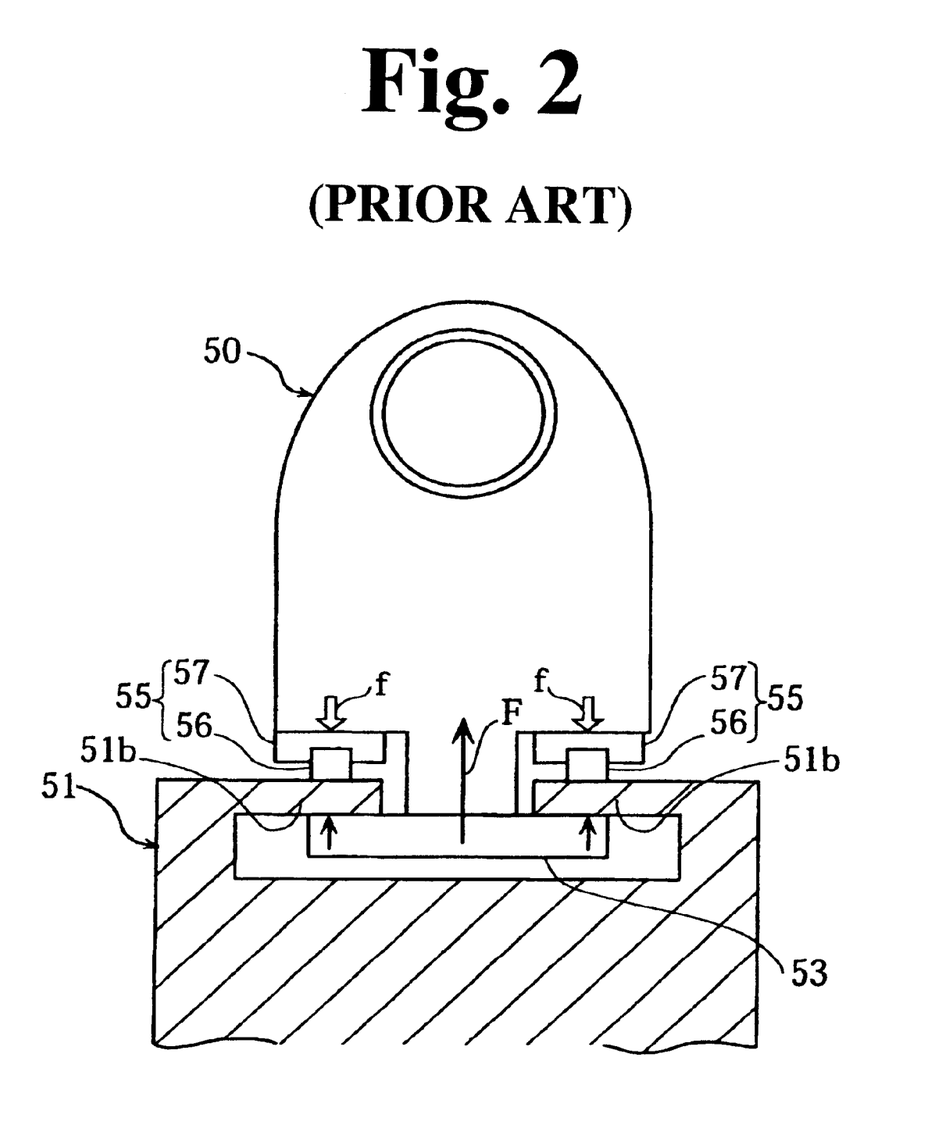
FIG. 2 is a partial cross sectional view showing a conventional clamping device.

A structure could be envisioned in which the tailstock 50 is movably supported by linear-motion bearings 55, as shown in FIG. 2, instead of the structure in which the tailstock 50 slides on the fixed bed 51. These linear-motion bearings 55 are generally structured, so that rails 56 fixed to the fixed bed 51 and blocks 57 fixed to the tailstock 50 are engaged with each other with rollers (not shown) interposed in between. In this way, frictional resistance can be reduced.

However, if this type of linear-motion bearing is used in the aforementioned conventional clamping device, there is a possibility that the rails 56 and the blocks 57 may suffer impressions. This occurs as a result of the rollers causing a reaction force f equivalent to the clamping force F acting directly on the linear-motion bearings 55. In addition, when using linear-motion bearings, the clamping force is inferior in proportion to a decrement of friction coefficient, which causes further problems.

In the structure of the aforementioned publication, the table is pinched between piezoelectric elements provided on the base, with a longer travel distance of the table. Therefore it is necessary to set multiple piezoelectric elements in a number corresponding to the travel distance, which disadvantageously increases the number of component parts.

SUMMARY OF THE INVENTION

An object of the invention is to provide a clamping device for machine tools capable of preventing the occurrence of impressions, as well as the reduction in clamping force when linear-motion bearings are adopted.

A further object of the invention is to provide a clamping device that avoids any increase in the number of parts.

In one aspect of the invention, there is provided a clamping device for machine tools comprising a movable carriage movably provided on a top face of a fixed bed so that the movable carriage can be positioned and fixed to the fixed bed. The clamping device also comprises:
  a guide disposed between the movable carriage and the fixed bed and extending in a direction in which the movable carriage travels so that the movable carriage is supported by said guide;
  a recess portion formed in the top face of the fixed bed and extending in the travel direction; and
  a cylinder mechanism disposed at an undersurface of the movable carriage, the cylinder mechanism having at least two pistons provided in opposite directions so as to be opposed to left and right inner walls of said recess portion, respectively, so that said inner walls are pressed by the pistons, respectively when said pistons are extended.

In a second aspect of the invention, there is provided a clamping device for machine tools further comprising:
  a movable rack fixed to one of the pistons opposed to one of the left and right inner walls, and
  a fixed rack fixed to one of said inner walls, wherein the fixed rack is opposed to and engaged with the movable rack.

In a third aspect of the invention, there is provided a clamping device for machine tools comprising a movable carriage movably provided on a top face of a fixed bed so that the movable carriage can be positioned and fixed to the fixed bed. The clamping device also comprises a guide disposed between the movable carriage and the fixed bed and extending in a direction in which the movable carriage travels, the movable carriage being supported by the guide. A strip shaped plate is disposed on the fixed bed extending in the travel direction; and a cylinder mechanism is disposed on an undersurface of the movable carriage. The cylinder mechanism has at least two pistons provided so as to be opposed to each other with the strip shaped plate interposed therebetween so that said plate is pinched by the pistons when the pistons are advanced.

As used herein, the term "guide" includes, for example, a linear-motion bearing in which blocks are slidably engaged with rails with rollers or balls interposed in between. Suitable guides also include, for example, a slide guide allowing sliding contact between the movable carriage and the fixed bed at their sliding surfaces.

According to the clamping device in a first aspect of the invention, since a pair of pistons are provided at the undersurface of the movable carriage, and the movable carriage is positioned and fixed by the pistons exerting pressing force on the left and right inner walls within the recess portion of the fixed bed, the clamping force acts only on the fixed bed and never acts on the guide surface. Therefore, for example, when linear-motion bearings are used, the occurrence of impressions as well as a lowering of the clamping force can be prevented.

In addition, since the cylinder mechanism is provided on the movable carriage, it is only necessary to provide a single or small number of cylinder mechanisms regardless of the length of the travel distance of the movable carriage. Thus, the invention avoids the problem of having to increase the number of piezoelectric elements with an increase in length of the travel distance. This problem arises when piezoelectric elements of a conventional clamping device are disposed on the fixed bed side. In contrast, the number of cylinder mechanisms can be minimized, and the cost can be further reduced when using the present invention.

In a second aspect of the invention, since the movable rack is fixed to one of the pistons opposed to one of the left and right inner walls, and the fixed rack with which the movable rack is engaged is fixed to the fixed bed, the clamping force of the movable carriage can be enhanced while utilizing a simple structure.

In a third aspect of the invention, since the strip shaped plate provided on the fixed bed is pinched by a pair of pistons provided on the undersurface of the movable carriage, the clamping force never acts on the guide surface. This prevents the problems of impressions and a lowering of the clamping force. Moreover, only a small number of cylinder mechanisms are required regardless of the length of the travel distance.

DETAILED DESCRIPTION OF THE PREFERRED EMBODIMENTS

Embodiments of the present invention are described in further detail with reference to the accompanying drawings.

FIGS. 3 to 7 are views for explaining a clamping device for a slant bed type lathe (machine tool) according to an embodiment of the invention. In these figures, identical or corresponding elements are designated by like reference numerals.

Referring to FIGS. 3 to 7, a slant bed type lathe generally has a structure such that a tailstock 3 is right-and-left movably set on the right side of the slant type bed 2, a headstock 4 is fixed on the left side of bed 2, and a tool post is back-and-forth, right-and-left movably set behind the center line between the headstock 4 and the tailstock 3.

A chuck 6 for grasping the workpiece is fitted to the headstock 4, and a tailstock spindle 7 for holding the workpiece between itself and the chuck 6 is fitted to the tailstock 3. In this tailstock 3, a tailstock body 3b is mounted on a base 3a, and the tailstock spindle 7 is back-and-forth movably fitted to the tailstock body 3b.

Figure 7:
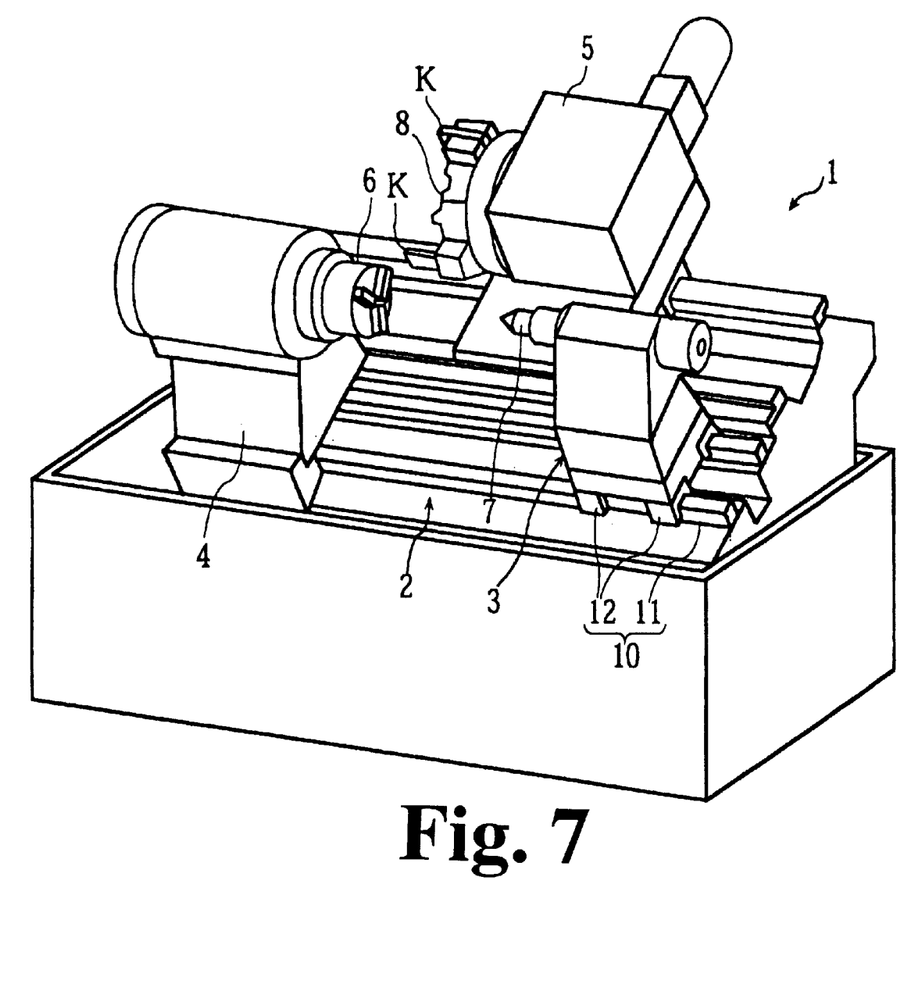
FIG. 7 is a schematic perspective view of the lathe.

As shown in FIG. 7, a turret head 8 for holding a plurality of tools K is rotatably fitted to the tool post 5. A turret indexing unit (not shown) for indexing the turret head 8 to make a required tool selectively usable is provided inside the turret head 8 and tool post 5.

Figure 3:
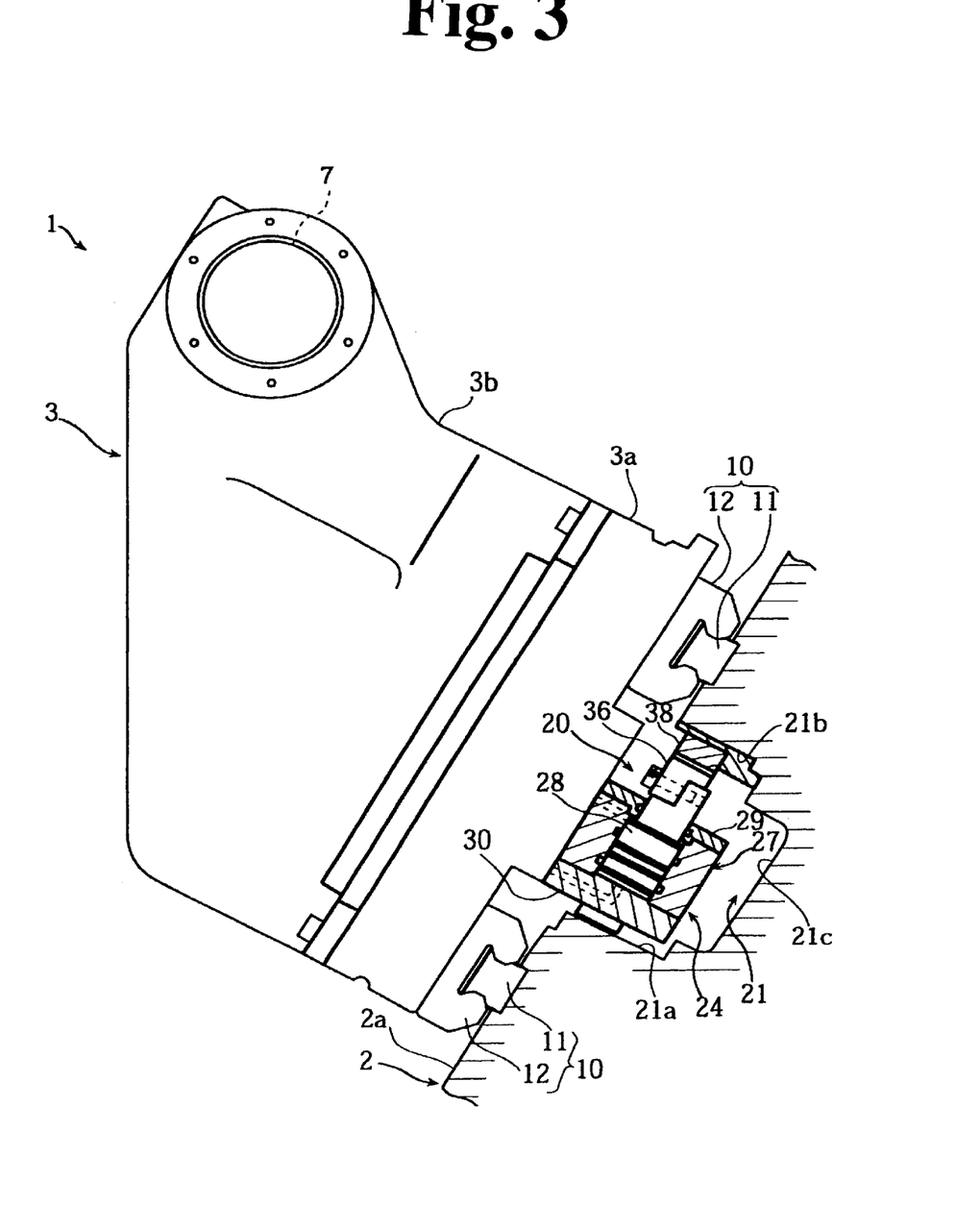
FIG. 3 is a right sideview of a clamping device of a slant bed type lathe according to an embodiment of the present invention.

The tailstock 3 is guided and supported by two linear-motion bearings 10 so as to be movable along the direction of the spindle. These linear-motion bearings 10, which are disposed on the top face 2a of the fixed bed 2, each comprises a rail 11 extending in parallel to the travel direction and two blocks 12 disposed on the bottom face of the tailstock 3 and slidably fitted to the rail 11.

Figure 6:
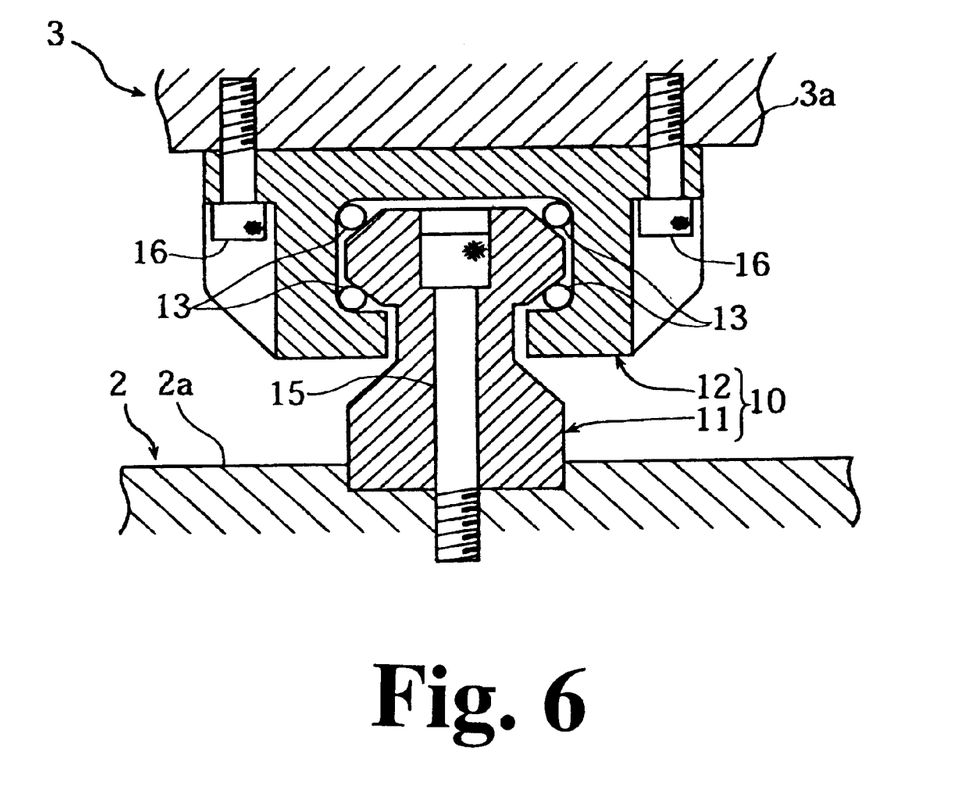
FIG. 6 is a sectional view of linear-motion bearings in the embodiment according to the present invention.

As shown in FIG. 6, each rail 11 has a rod formed in a rectangular shape in cross section and is tightly secured to the fixed bed 2 with a bolt 15 inserted through the central part of the rail 11. Also, each block 12 is generally an inverted U-shape in cross section and is in rolling contact with the rail 11 with a large number of rollers 13 interposed between them. Each block 12 is tightly secured to four corners of the undersurface of the base 3a of the tailstock 3 with bolts 16. In addition, balls may be interposed in place of the rollers 13.

Figure 5:
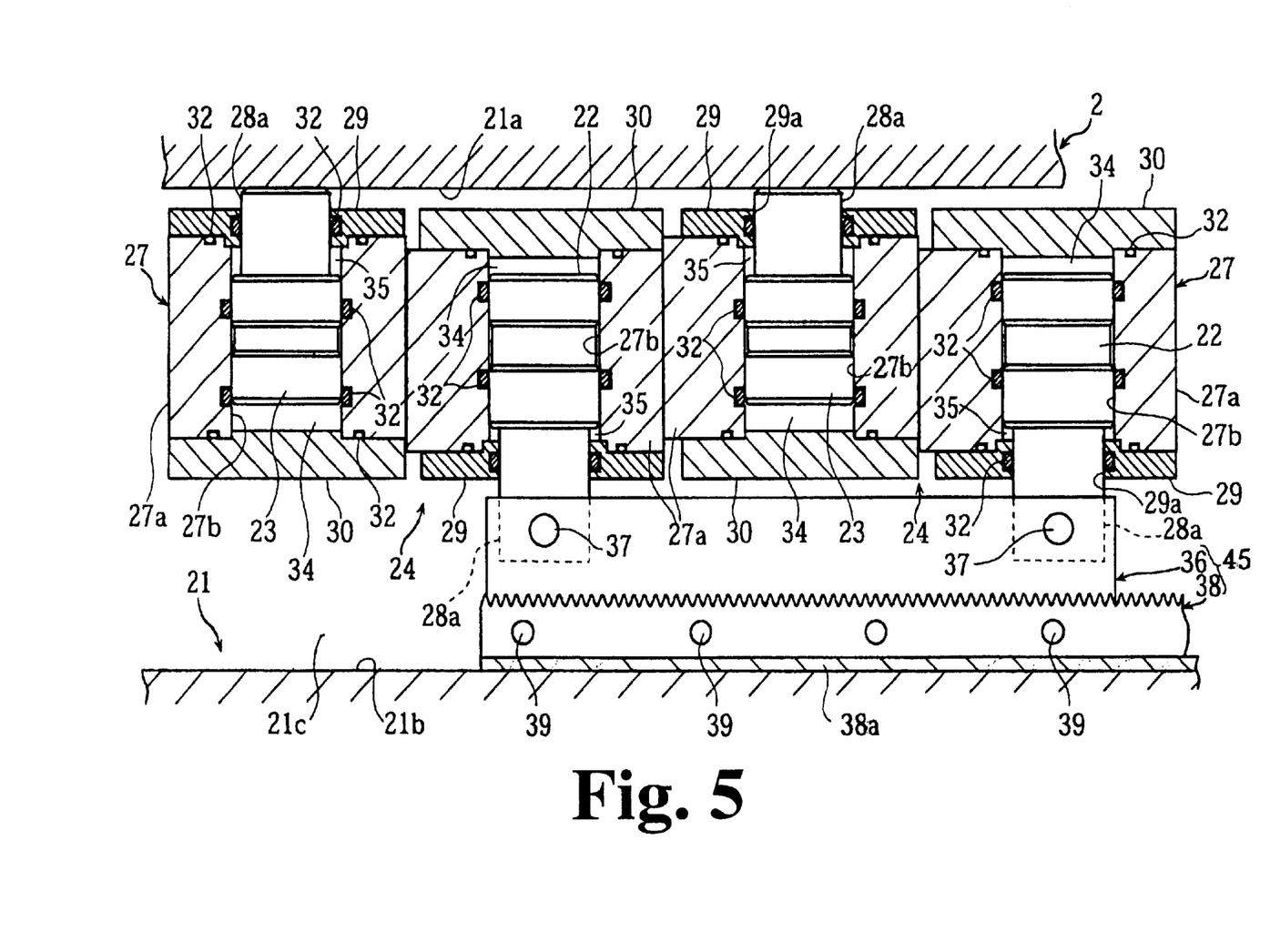
FIG. 5 is a sectional plan view showing a clamped state of the clamping device according to the present invention.

As shown in FIGS. 3 and 5, a clamping device 20 is provided between the tailstock 3 and the fixed bed 2. This clamping device 20 comprises one or more cylinder mechanisms 24 set within a recess portion 21 recessed between the two rails 11 of the fixed bed 2. In this example, two cylinder mechanisms 24 are present. The clamping device 20 also comprises a rack mechanism 45 which is driven into engagement and disengagement by the cylinder mechanisms 24. The recess portion 21 comprises left and right inner walls 21a, 21b and a bottom wall 21c, as viewed from the right side of the lathe 1, and is formed over the right-and-left overall length of the fixed bed 2.

Figure 4:
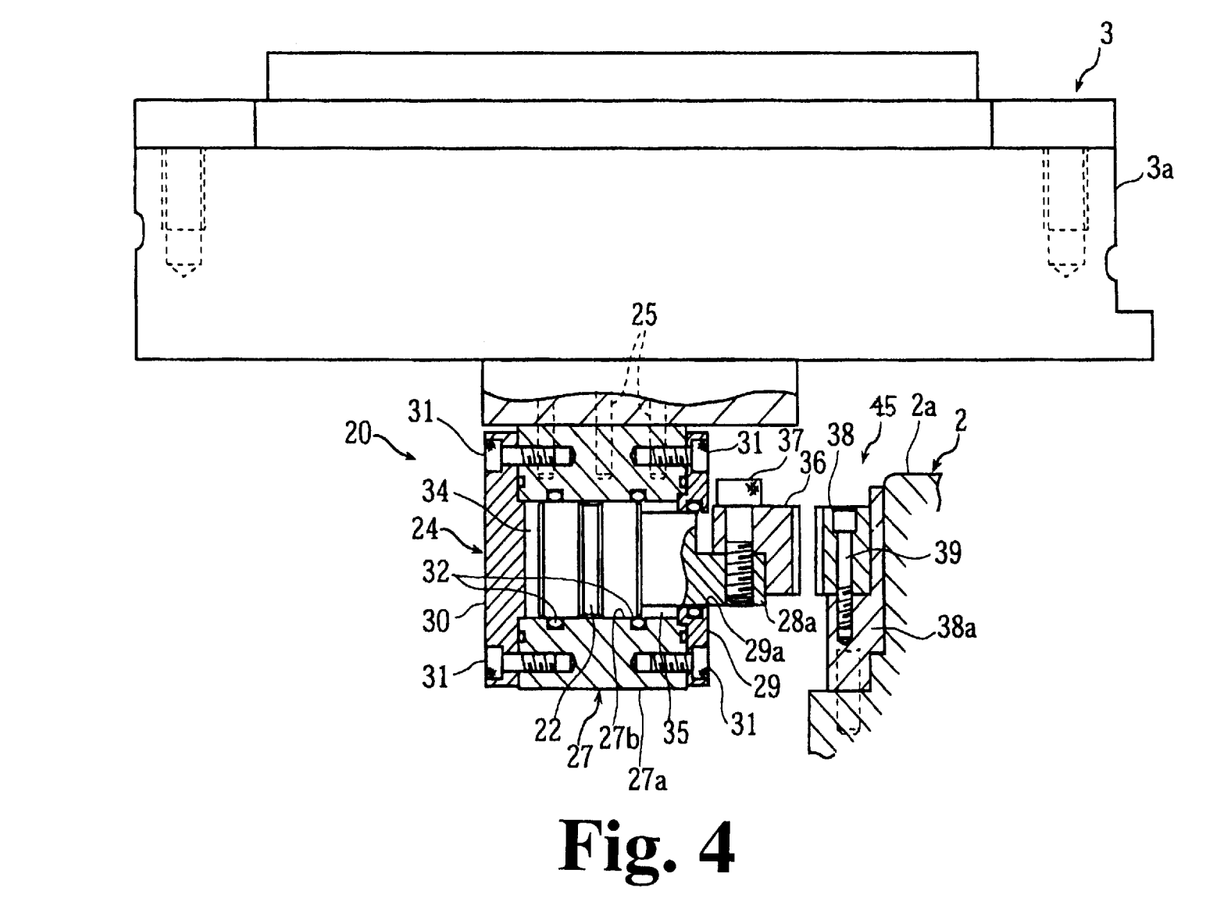
FIG. 4 is a sectional side view showing an unclamped state of the clamping device according to the present invention.

The cylinder mechanisms 24 have a structure such that first and second pistons 22, 23 are provided in cylinder holes 27b, 27b formed in a cylinder member 27 so that the first and second pistons 22, 23 are advanceable and retractable alternately in opposite directions. Rod portions 28a of the first and second pistons 22, 23 are projected outward from the cylinder holes 27b, respectively. In each of the cylinder members 27, the cylinder hole 27b is bored through a rectangular parallelepiped cylinder body 27a.

Lid plates 29, 30 are tightened to both end faces of the cylinder body 27a with a plurality of bolts 31, respectively. The rod portion 28a is projected from an opening 29a in one side of lid plate 29. The cylinder member 27 is tightly fixed to the undersurface of the base 3a of the tailstock 3 with a plurality of bolts 25. Further, oil seals 32 are provided at the inner circumferential surface and both end faces of the cylinder hold 27b, and at the inner circumferential surface of the opening 29a of the lid plate 29, respectively.

The cylinder hole 27b is internally divided into first and second hydraulic chambers 34, 35 by the first and second pistons 22, 23, respectively. The first and second pistons 22, 23 are advanced by oil pressure supplied into the first hydraulic chamber 34 and retracted by oil pressure supplied into the second hydraulic chamber 35. The first and second pistons 22, 23 are set so as to be movable back-and-forth along a direction parallel to the top face 2a of the fixed bed 2 and perpendicular to the travel direction of the tailstock 3.

The first piston 22 is opposed to the right inner wall 21b within the recess portion 21, and the second piston 23 is opposed to the left inner wall 21a on the opposite side. Thus, the first and second pistons 22, 23 are in pressure contact with the left and right inner walls 21a, 21b in a mutually pressing fashion. In this way, the cylinder member 27 and the tailstock 3 are positioned and fixed at a specified position.

A movable rack 36 is provided so as to be stretched to the rod portion 28a of the first piston 22 and tightly fixed with bolts 37. Also, a fixed rack 38 having a length corresponding to the travel distance of the tailstock 3 is disposed on the right inner wall 21b of the recess portion 21. This fixed rack 38 is securely tightened with bolts 39 to a bracket 38a securely bolted to the right inner wall 21b. Further, the movable rack 36 is opposed to and engageable with the fixed rack 38.

Next, the operation and effects of this embodiment are explained below.

In the lathe 1 of this embodiment, the tailstock 3 is positioned and fixed. The workpiece is held by the chuck 6 of the headstock 4 and the tailstock spindle 7 of the tailstock 3. In this manner, specific machining processes are carried out with the tool while the workpiece is being rotated.

In order to position and fix the tailstock 3, the fixing position of the tailstock 3 is determined, then the first and second pistons 22, 23 are advanced. The movable rack 36 fixed to the first piston 22 is engaged with the fixed rack 38 while the second piston 23 presses the left inner wall 21*a* of the recess portion 21. Thus, the cylinder member 27 and the tailstock 3 are positioned and fixed.

According to the present embodiment, the cylinder member 27 is fixed to the undersurface of the tailstock 3, and then the tailstock 3 is positioned and fixed by pressing the left and right inner walls 21*a*, 21*b* of the recess portion 21 of the fixed bed 2 by means of the first and second pistons 22, 23 provided within the cylinder member 27. The resulting clamping force acts only on the left and right inner walls 21*a*, 21*b* of the fixed bed 2, and the clamping force never acts on the linear-motion bearings 10. As a result, the occurrence of any impressions on the rails 11, 11 and the blocks 12 is prevented, and there is no lowering of the clamping force. This makes the linear-motion bearings 10 particularly practical, and frictional resistance can be reduced.

Further, since the cylinder member 27 for holding the first and second pistons 22, 23 is fixed to the tailstock 3, it is only necessary to dispose a small number of pistons regardless of the travel distance of the tailstock 3. Therefore, the number of pistons can be reduced, and thus the cost for component parts can also be reduced, as compared with the use of piezoelectric elements disposed on the base side.

In this embodiment, since the movable rack 36 is fixed to the first piston 22, and the fixed rack 38 is fixed to the right inner wall 21*b* of the recess portion 21, the clamping force of the tailstock 3 can be enhanced with a simple structure and wearing out of the workpiece can be prevented with higher reliability. Further, since the first and second pistons 22, 23 are placed in parallel to each other and alternately in opposite directions, the pressing force to the fixed bed 2 can be exerted with good balance. Moreover, the placement space within the recess portion 21 can be ensured with ease.

Figure 8:
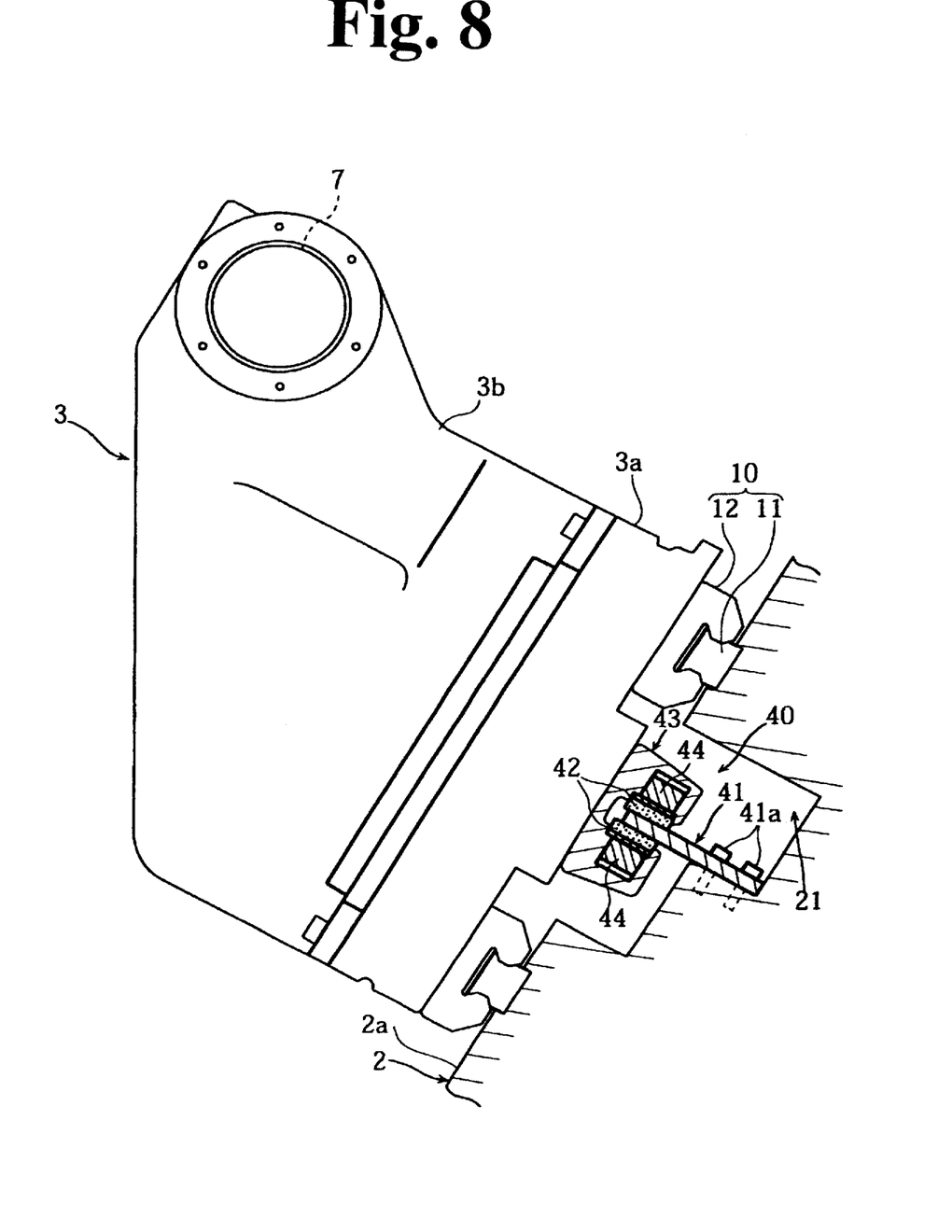
FIG. 8 is a right side view showing a clamping device according to another embodiment of the present invention.

FIG. 8 is a view for explaining a clamping device according to another embodiment of the invention. In the figure, the same reference numerals as in FIG. 3 designate like or equivalent component parts.

In the clamping device 40 of this embodiment, a strip shaped plate 41 having a length corresponding to the travel length of the tailstock 3 is provided in the recess portion 21 of the fixed bed 2 and secured with a bolt 41*a*. Further, a housing 43 is fixed to the undersurface of the tailstock 3. A pair of pads 42, 42 are provided opposite to each other within the housing 43 with the plate 41 interposed between them. Further, pistons 44 for pressing the individual pads 42 using oil pressure are provided within the housing 43. The pads 42, when released from being pressed, are returned by return springs (not shown).

According to this embodiment, since the plate 41 fixed to the fixed bed 2 is pinched by a pair of pistons 44 set on the undersurface of the tailstock 3, the clamping force acts only on the plate 41 and never acts on the linear-motion bearings 10. Thus, in this case also, effects generally similar to those of the foregoing embodiment can be obtained. For the clamping device 40, it is also possible to use, for example, commercially available disc brake parts for vehicles, in order to lower costs.

Although the above embodiments have been described with respect to the case where the tailstock of the lathe is clamped, the clamping device of the present invention is not limited to this. The invention is also applicable for clamping steady rest, movable tables, pallets and the like.

Also, although the tailstock is guided and supported by linear-motion bearings in the above embodiments, the present invention is not limited to this arrangement. For example, the present invention is also applicable to slide guides implemented by bringing into sliding contact the sliding surfaces of the fixed bed and the tailstock into sliding contact. In this case also, the clamping force does not act on the slide guide surface and thus does not result in undesirable indentations on the guide.

What is claimed is:

1. A clamping device for machine tools, comprising:

a movable carriage movably provided on a top face of a fixed bed so that said movable carriage can be positioned above and movably fixed to the fixed bed;

a guide disposed between said movable carriage and said fixed bed and extending in a direction in which said movable carriage travels, said movable carriage being supported by said guide;

a strip shaped plate disposed on said fixed bed extending in a travel direction of said movable carriage; and a cylinder mechanism disposed on an undersurface of said movable carriage, wherein said cylinder mechanism having at least two pistons oriented so as to be opposed to each other with said strip shaped plate interposed therebetween so that said strip shaped plate is pinched by said pistons when said pistons are extended.

2. A clamping device for machine tools as claimed in claim 1, comprising a plurality of cylinder mechanisms disposed on the undersurface of the movable carriage.

* * * * *